United States Patent

Villax

[15] 3,637,463

[45] Jan. 25, 1972

[54] PRODUCTION OF OXYTETRACYCLINE USING STREPTOMYCES ALBOFLAVUS (ATCC 15388)

[72] Inventor: Ivan Villax, Lisbon, Portugal

[73] Assignee: International Rectifier Corporation, Los Angeles, Calif.

[22] Filed: Aug. 16, 1967

[21] Appl. No.: 660,936

Related U.S. Application Data

[63] Continuation-in-part of Ser. No. 312,877, Oct. 1, 1963, abandoned.

[30] Foreign Application Priority Data

Oct. 19, 1962 Portugal..................................40,140

[52] U.S. Cl..........................195/80, 260/559 AT, 195/114
[51] Int. Cl. .......................................................C12d 9/00
[58] Field of Search....................195/80, 100, 114; 260/559, 260/559 AT

[56] References Cited

UNITED STATES PATENTS 2,516,080   7/1950   Sobin et al. ..........................195/80 X

FOREIGN PATENTS OR APPLICATIONS 91,397   9/1959   Czechoslovakia......................195/80

Primary Examiner—Joseph M. Golian
Attorney—Wenderoth, Lind & Ponack

[57] ABSTRACT

A fermentative process for the production of oxytetracycline which comprises fermenting a nutrient broth under aerobic conditions at a temperature between 22° and 30° C. by a mutant of *Streptomyces alboflavus* (Waksmann & Curtis), and recovering accumulated oxytetracycline from the fermented broth.

5 Claims, No Drawings

PRODUCTION OF OXYTETRACYCLINE USING STREPTOMYCES ALBOFLAVUS (ATCC 15388)

This application is in part a continuation of copending application, Ser. No. 312,877, filed Oct. 1, 1963 and now abandoned.

The present invention relates to the production of oxytetracycline and in particular to the production of oxytetracycline by means of submerged fermentation by a mutant strain of *Streptomyces alboflavus*.

The referred mutant strain has been deposited in the collection of Central bureau Vor Schimmelcultures, Baarn, Holland, under the denomination *streptomyces alboflavus* M–108–OX. (It is also on deposit at American Type Culture Collection as ATCC No. 15388.)

*Streptomyces alboflavus* is a known species and, according to "Bergey's Manual of Determinative Bacteriology," 7th Edition, published by "The Williams & Wilkins Company," Baltimore, Maryland, 1957, it was formerly described by Waksmann and Curtis in 1916 and reclassified by Waksman and Heinrici in 1948.

However, *Streptomyces alboflavus*, such as described and supplied by the various collections of strains, is not adequate for the production, either experimental or industrial, of oxytetracycline.

The original strain of *Streptomyces alboflavus*, which was submitted to mutation and selection with a view to obtaining the mutant utilized in the present process of invention, was obtained from the collection of Central bureau Voor Schimmelcultures, Baarn, Holland (hereafter referred to as CBS), and is a direct descendant of Waksmann's type strain. This strain produces essentially antibiotics belonging, with all probability, to the group of the actinomycines, showing $R_f$s of 0.85 to 0.95, after the fermented broth has been submitted to paper chromatography, and a purple color under Wood light.

The mutant, object of the present invention, was obtained by ultraviolet irradiation of the single spore cultures of the above-mentioned original type culture followed by a careful selection according to known criteria and technique. Of the various mutants thus formed, several types were chosen, after analytical evaluation, for the production of oxytetracycline, one of which is hereinafter described in detail.

With a view, on one hand, to characterizing the mutant *Streptomyces alboflavus* M–108–OX and, on the other, to demonstrating the amplitude of the changes of characteristics, following is the comparative description between:

*Streptomyces alboflavus*, obtained from CBS, "Waksmann Type Strain."

*Streptomyces alboflavus* M–108–OX, a mutant obtained according to the invention from the previous strain, and

*Streptomyces rimosus*, (Sobin, Finlay et al.) a type strain obtained from CBS.

The latter was included in the present description solely for comparative purposes, as it is the best known micro-organism producing oxytetracycline.

The three strains were simultaneously cultivated in 14 culture media and their characteristics, such as the color of culture and sporulation (in the case of such being present), color of formation of pigments, etc., were observed and described. After repeated cultures, the following characteristics, after 16 days of inculation at 26° C., were observed.

1. On coon steep liquor (0.6 percent) medium having the following composition:

| | |
|---|---|
| Agar agar | 10 grams |
| Corn steep liquor 50% | 3 grams |
| Glucose | 15 grams |
| $(NH_4)_2HPO_4$ | 2.5 grams |
| $KH_2PO_4$ | 7.5 grams |
| $MgSO_4 \cdot 7H_2O$ | 1 gram |
| $MnCl_2$ | 0.002 gram |
| $CuSO_4 \cdot 5H_2O$ | 0.002 gram |
| $ZnSO_4 \cdot 7H_2O$ | 0.025 gram |
| Water | 500 milliliters |
| pH 7, after sterilization. | |

*Streptomyces alboflavus*, produces shiny, well separated, dirty-yellow colonies, no spores or pigment being formed, while *Streptomyces alboflavus* mutant M–108–OX produces white to slightly greyish spore colonies and light brown diffusible pigment; *Streptomyces rimosus* grows scantly, without any sporulation, producing a beige colony with scant aerial mycelium and slight light brown diffusible pigment.

2. On corn steep liquor (0.4 percent) medium, of the same composition, as above, except for the quantity of corn steep liquor being 2 grams instead of 3 grams, the three strains grow similarly to that on medium No. 1, although the growth is slower.

3. On gelatin medium, having the formula:

| | |
|---|---|
| Meat extract | 1.5 gram |
| Peptone | 2.5 grams |
| Gelatin | 80 grams |
| Distilled water | 500 milliliters |
| pH 6.2, before sterilization. | |

The three strains grow fairly well on this medium, producing a rather slow liquefaction, *Streptomyces alboflavus* mutant M–108–4. Czapek-Dox-Dextrine medium of the formula:

| | |
|---|---|
| Dextrine | 5 grams |
| $NaNO_3$ | 1 gram |
| $K_2HPO_4$ | 0.5 gram |
| $MgSO_4 \cdot 7H_2O$ | 0.25 gram |
| KCl | 0.25 gram |
| $FeSO_4$ | a small crystal |
| Agar agar | 7.5 grams |
| Distilled water | 500 milliliters |
| pH 6.8, after sterilization. | |

*Streptomyces alboflavus* produces well separated, round, light beige colonies, which are surrounded by a white halo formed by young aerial mycelium with very scant, light beige diffusible pigment, while *Streptomyces alboflavus* mutant M–108–forming white aerial mycelium, which covers up the initial color. *Streptomyces rimosus* grows slowly without producing aerial mycelium and forming fused brown colonies and dark-beige diffusible pigment.

5. Potato plug:

A plug of potato ($\phi$ 1.5 cm., 3–6 cm. height) is washed with a solution of 10 percent $Na_2CO_3$ and sterilized in an assay tube together with 1.5 cc. of distilled water.

*Streptomyces alboflavus* produces a pinkish-beige vegetative growth and scant dirty white to beige aerial mycelium, while *Streptomyces alboflavus* mutant M–108–OX rapidly produces a thick white aerial mycelium showing a wrinkled aspect. *Streptomyces rimosus* grows well, covering the surface of the potato plug with a bronze to shiny bronze violet alveolated growth, without producing aerial mycelium. The color of the potato plug remains unchanged where there is no growth, with the exception of *Streptomyces rimosus* which produces a dark brown coloration of the plug.

6. Benett medium of the formula:

| | |
|---|---|
| Yeast extract | 0.5 gram |
| Meat extract | 0.5 gram |
| Hydrolyzed caseine | 1 gram |
| Glucose | 5 grams |
| Agar agar | 10 grams |
| Distilled water | 500 milliliters |

The pH adjusted to 7, gives after sterilization pH 6.7.

On this medium *Streptomyces alboflavus* only produces vegetative growth and no pigment or mycelium.

*Streptomyces alboflavus* mutant M–108–OX produces steel blue vegetative growth with white to greyish white aerial mycelium and dark brown diffusible pigment.

*Streptomyces rimosus* grows slowly, producing dark beige vegetative colonies and a rare light greyish aerial mycelium.

7. Glycerin-asparagine medium of the formula:

| | |
|---|---|
| Glycerin | 5 grams |
| Asparagine | 0.25 gram |
| Meat extract | 1 gram |
| $K_2HPO_4$ | 0.25 gram |
| Agar agar | 7.5 grams |
| Distilled water | 500 milliliters |
| pH 6.9 after sterilization. | |

*Streptomyces alboflavus* produces shiny, dirty white, distinct colonies without any aerial mycelium or pigment, while *Streptomyces alboflavus* mutant M–108–OX produces dark brown almost black colonies, forming white aerial mycelium and bronze to bronze violet diffusible pigment. *Streptomyces rimosus* produces light yellow diffusible pigment, and light beige colonies with scant dirty-white aerial mycelium.

8. Czapek-Dox medium of the formula:

| | |
|---|---|
| $NaNO_3$ | 1 gram |
| $K_2HPO_4$ | 0.5 gram |
| $MgSO_4 \cdot 7H_2O$ | 0.25 gram |
| KCl | 0.25 gram |
| $FeSO_4$ | a small crystal |
| Distilled water | 500 milliliters |
| Agar agar | 7.5 grams |
| pH 7.1, after sterilization. | |

There is no growth on this medium with the exception of a poor light-yellow vegetative growth in the case of *Streptomyces alboflavus*.

9. Emerson medium of the formula:

| | |
|---|---|
| Yeast extract | 2 grams |
| Soluble starch | 7.5 grams |
| $K_2HPO_4$ | 0.5 gram |
| $MgSO_4 \cdot 7H_2O$ | 0.25 gram |
| Agar agar | 10 grams |
| Distilled water | 500 milliliters |
| pH 7, after sterilization. | |

On this medium *Streptomyces alboflavus* produces flat slightly wrinkled, yellow beige colonies and diffusible pigment of the same color, aerial mycelium is lacking, while *Streptomyces alboflavus* mutant M–108–OX and *Streptomyces rimosus* grow alike, producing yellow to beige vegetative colonies and yellow brownish pigment, this being a bit lighter in the case of the last strain.

10. Czapek-Dox-Starch of the formula:

| | |
|---|---|
| Soluble starch | 5 grams |
| $NaNO_3$ | 1 gram |
| $K_2HPO_4$ | 0.5 gram |
| $MgSO_4 \cdot 7H_2O$ | 0.25 gram |
| KCl | 0.25 gram |
| $FeSO_4$ | a small crystal |
| Agar agar | 7.5 gram |
| Distilled water | 500 milliliters |
| pH 7, after sterilization. | |

The three strains grow exactly as they do on medium 4. of Czapek-Dox-Dextrine.

11. Purple milk medium, commercial medium of the firm Difco. pH 6.45 before sterilization.

The three strains grow well and there is no change in the pH.

12. Nutrient medium of the formula:

| | |
|---|---|
| Meat extract | 1.5 gram |
| Peptone | 2.5 gram |
| Agar agar | 7.5 grams |
| Distilled water | 500 milliliters |
| pH 6.8, after sterilization. | |

*Streptomyces alboflavus* produces distinct, round, shiny, dirty-white to slightly yellowish vegetative colonies with faint light-yellow diffusible pigment, while *Streptomyces alboflavus* mutant M–108–OX and *Streptomyces rimosus* present the same aspect, having beige to yellowish vegetative growth with faint light-golden diffusible pigment.

13. Glucose-Asparagine medium of the formula:

| | |
|---|---|
| Glucose | 1 gram |
| Asparagine | 0.25 gram |
| Meat extract | 1 gram |
| $K_2HPO_4$ | 0.25 gram |
| Agar agar | 7.5 grams |
| Distilled water | 500 milliliters |
| pH 6.9, after sterilization. | |

On this medium the aspect of the three strains is similar to that of the previous medium, growth being slower and the formed pigments lighter.

14. Sugar-Dextrine-Nitrate medium of the formula:

| | |
|---|---|
| Dextrine | 5 grams |
| $NaNO_3$ | 1 gram |
| $MgSO_4 \cdot 7H_2O$ | 0.25 gram |
| KCl | 0.25 gram |
| Dextrose | 15 grams |
| $FeSO_4$ | a small crystal |
| Distilled water | 500 milliliters |
| pH 7, after sterilization. | |

On this medium *Streptomyces alboflavus* produces rapidly growing white to beige aerial mycelium with light-yellow diffusible pigment. *Streptomyces alboflavus* mutant M–108–OX produces an almost black vegetative growth with dark brown diffusible pigment and scant white aerial mycelium. *Streptomyces rimosus* produces vegetative growth and diffusible pigment, both having a yellow brownish coloration, no aerial mycelium being formed.

The above-described media were prepared with products supplied by the firm E. Merck—Darmstadt (inorganic compounds and asparagine) and the remaining products by the firm Difco, Detroit.

*Streptomyces alboflavus* mutant M–108–OX produces conidias in great number, contrarily to its mother strain. The chains of conidias often form open spirals. The conidias are ellipsoidal, measuring 0.7 to 0.9 by 1.0 and 1.5 microns, and present a smooth surface. The masse spore color is olive buff.

The *Streptomyces alboflavus* mutant M–108–OX in the above comparative tests resembles in many aspects *Streptomyces rimosus*, but can be easily differentiated from *Streptomyces rimosus* by the fact that one finds in the single spore cultures of *Streptomyces alboflavus* mutant M–108–OX, in an approximative proportion of 1 to 3,000 to 1 to 30,000, colonies showing the characteristics of the original mother strain, i.e., *Streptomyces alboflavus* (CBS), while no such colonies appear in single spore cultures of *Streptomyces rimosus*.

Further comparison is shown in the following:

TABLE

| | *S. alboflavus* (Waksman et Curtis) Waksman CBS | *S. alboflavus* M–108–OX, CBS NCIB 9453, ATCC 15388 | *S. rimosus* (Finlay et al.)[1] |
|---|---|---|---|
| Surface of spores by electron microscope. | Smooth [2] | Smooth | Smooth. |
| Size and shape of spores | 0.4–0.6µx1.0–1.4µ rectangular-rod shaped (cylindrical). | 0.7–0.9µx1.0–1.5µ (0.4–0.7µx1.2–2µ in certain descendants) ellipsoidal to oblong ovoidal. | 0.6–0.7µx0.8–1.4µ cylindrical. |
| Sporophore morphology | Short, straight; chains of spores rare, up to 12 spores per chain (usually 2 to 6); monopodially branched on oat meal agar. | Straight to flexous with occasional hooks and loops; numerous sporophores; chain of spores up to 40 spores; sympodially branched on oat meal agar. | Spirals; numerous. |
| Using Pridham's grouping belongs to | *Rectus flexibilis* | *Retinaculum apertum* | *Spira spira* (Pridham)[3], verticillata (Waksman).[4] |
| Color of spores "en masse" | Yellow (according to Pridham).[3] | On calcium citrate agar: Pearl Pink Shell (3 ca) at edges, Lead Gray (5 ih)[7] in center; on oat meal agar: Lead Gray (5 ih);[7] on calcium malate agar: olive-buff in center. | Ocher colored in center, colonial buff at edge. Belongs to series, white[3] cinnamonous.[5] |

Table—Continued

| | S. alboflavus (Waksman et Curtis) Waksman CBS | S. alboflavus M-108-OX, CBS NCIB 9453, ATCC 15388 | S. rimosus (Finlay et al.)[1] |
|---|---|---|---|
| Pigment formation on Ettlinger's tyrosine agar. | None | None | Produces first hallochrome, which oxidizes into melanin.[x] |
| Starch | Hydrolyzed | Hydrolyzed | Hydrolyzed. |
| Temperature of optimum growth, °C | 37 | 28 | |
| Calcium citrate agar, 5 g./l | Not clarified | Not clarified | Clarified.[x] |
| Cellulose | | Very good growth | No growth.[x] |
| Utilization of carbon sources:[5] | | | |
| l-Rhamnose | | (−) | |
| Raffinose | | (−) | |
| l-arabinose | | + | |
| d-Xylose | | (+) | |
| d-Fructose | | + | |
| d-Mannitol | | (−) | |
| Habitat | Soil [1] | Mutant obtained on oat meal agar by selection under U.V. light from well sporulated S. alboflavus (Waksman et Curtis) Waksman type strain, CBS. | Soil. |

The data for *S. alboflavus* (Waksman et Curtis) Waksman and *S. alboflavus* M-108-OX CBS are from parallel assays, unless otherwise indicated. All media of the composition as described in Waksman: "The Actinomycetes," Vol. II, Appendix II, pages 328-334, The Williams & Wilkins Company—Baltimore, Maryland, 1961.

The data for *S. Rimosus* (Finlay et al.) have been taken from:

1. Bergey's Manual of Determinative Bacteriology, 7th Edition, The Williams & Wilkins Company, Baltimore, Maryland, 1957, excepting results marked (x) which were obtained in parallel comparative assays with *S. rimosus* (Waksman et Curtis) Waksman CBS.
2. Prof. E. Baldacci, personal communication.
3. Pridham et al., Appl. Microbiol. 6, pages 52-79, 1958.
4. Waksman: "The Actinomycetes," Vol. I, page 59, The Williams & Wilkins Company, Baltimore, 1959.
5. Ettlinger et al., Arch. für Mikrobiologie, 31, pages 326-357, 1958.
6. Zähner, Ettlinger, Arch. für Mikrobiologie 26, pages 307-328, 1957.
7. Color Harmony Manual, 4th Edition, 1958, Container Corp. of America, Chicago, Illinois.

No test made or data available.

*Streptomyces alboflavus* mutant M-108-OX is adequate for industrial submerged fermentation, giving high yields.

The aqueous nutrient medium for the industrial fermentation contains an assimilable nitrogen source, carbon source and mineral salts.

As a nitrogen source one can use caseine hydrolyzate, extract of malt, of barley or of corn, corn steep liquor, peanut meal, soya meal, etc.

As a carbon source one can use various carbohydrates containing glucose, dextrose, maltose, starch, dextrine, etc. Besides the mineral salts, present in traces, such as iron, copper, cobalt, zinc, the medium also contains calcium carbonate and ammonium phosphate with the primary regard to adjust the pH of the medium.

The quantity and proportion of the nutrient elements are indicated in the examples (infra).

The addition of N,N'-dibenzylethylenediamine (DBED) to the nutrient media, prepared according to the previous paragraphs, causes a higher yield in comparison to the similar parallel assays performed without addition of DBED. To obtain good results, the quantity of DBED to be added must be from 100 to 3,000 milligrams/liter of medium. Better results are obtained by adding DBED in the form of acetate or lactate in several fractions during fermentation, the initial quantity added to the medium before inoculation being 10 to 100 milliliters/liter. Fermentation is performed at a temperature of 24° to 30° C. with strong aeration in the order of 0.1 to 0.7 part of the volume to be fermented, varying according to the stage of fermentation.

To obtain best results the pH is adjusted to between 7 and 7.5 at the beginning of fermentation; then it decreases to 5.2-5.6 and afterwards returns to 6.2-6.5 at the end of fermentation.

The period of fermentation until the maximum yield is obtained is 96 to 150 hours according to the fermentation conditions.

After the fermentation is concluded, the antibiotic is extracted by acidification of the medium until pH 1 to 2, with an acid. The acidified medium is then filtered. The antibiotic remains essentially in the filtrate, from where it can be isolated by any of the known methods, either by precipitation or extraction in organic solvent, etc., followed by recrystallization. However, it is preferable to use the DBED method, by proceeding in the following way:

One increases the pH of the filtrate of the acid extraction until pH 5-6 with aqueous ammonium (12 percent) and adds DBED acetate until a concentration of one-tenth up to one-fifth in weight of the oxytetracycline contained in the fermented medium (the quantity of DBED already added during fermentation having been deducted in cases where it applies) is obtained. One then adjusts the pH to 8.5-9 with aqueous ammonium (12 percent) which causes the precipitation of the DBED complexes of oxytetracycline in an almost pure state, these having a composition equivalent to oxytetracycline$_2$·DBED·Ca (in the event of the medium containing calcium ions). Complexes having another composition of lesser importance can also be formed. One filters the precipitate of the complex, washes it with water and dries it under vacuum at 35° to 60° C. After having pulverized the complex, one recrystallizes it in an aliphatic alcohol containing one to three atoms of carbon, and acidifies it until pH 1 to 2 with gaseous hydrochloric acid. The oxytetracycline hydrochloride thus formed crystallizes after 6 hours.

By acidifying the complex up to the isoelectric point in aqueous medium, the oxytetracycline precipitates in the form of base, having the formula:

$$C_{22}H_{24}N_2O_9 \cdot 2H_2O$$

and the following centesimal composition:

Calculated: C 53.22% H 5.68%; N 5.64%; H$_2$O 7.26%
Found: C 53.16% H 5.61%; N 5.7%; H$_2$O 7.4%

The melting point is 180°-183° C. with decomposition and the optical rotation $[\alpha]_D$ −196.5 (C=1 in 1/10 N HCl). Ultra violet absorption in 0.1 molar phosphate buffer at pH 4.5 (E$^{1\%}_{1cm}$  240 at 298 m$\mu$., 322 at 276 m$\mu$., 300 at 353 m$\mu$.).

Regardless of whether the product obtained is hydrochloride or base, by comparison with the corresponding standards of reference (of the Food and Drug Administration) it is identical to oxytetracycline from the standpoint of both analytical and antibacterial action. The industrial advantage of the present process of invention, using the artificial mutant *Streptomyces alboflavus* M-108-OX, consists essentially in the very high yields obtained, which surpass be far the highest yields already published when using strains of *Streptomyces rimosus*.

The following examples are used to illustrate the present process of invention.

EXAMPLE 1

(This exemplifies mutant production).

*Streptomyces alboflavus* (type strain CBS) is first transferred to two culture media (1 and 2 infra), conveniently in large (22/180 mm.) test tubes (at least six tubes each) with a view to obtaining sporulation. The composition of media 1 and 2 is as follows:

I. Mutation:

Medium No. 1

Eight hundred milliliters of tap water are heated to boiling, 60 grams of oat flakes are added slowly and then digested on the water bath of 15 minutes. The digested mass is then filtered, while still hot, through a gauze sheet, 20 grams of agar added to the filtrate and the mixture heated until homogeneous admixture of the agar is achieved, after which the whole is made up to a volume of 1,000 milliliters with tap water. The pH is then adjusted to 6.3 and the mass subjected to sterilization in an autoclave at 120° C. for 20 minutes. The resultant oat flakes extract solution has a pH of 6.8 after the sterilization.

Medium No. 2

| | |
|---|---|
| Agar | 20 grams |
| Calcium citrate 5 grams | |
| Ammonium chloride | 0.5 gram |
| Dipotassium hydrogen phosphate | 0.5 gram |
| Glycerin | 10 grams |
| Tap water | 1,000 milliliters |

After adjusting the pH to 6.9, sterilization is effected at 120° C. for 30 minutes. Final pH 6.7.

Ripe spores are usually obtained after 2 to 4 weeks when incubating at 27°–28° C.; if not, subcultures are made, alternating the above two media, until sporulation occurs.

Afterwards, the best sporulated tube is selected, and 5 milliliters of sterile water added to it and the tube shaken with a view to obtaining a good spore suspension.

This spore suspension is then diluted 1,000, 10,000 and 100,000 times with 0.5 percent aqueous agar and maintained at 40°–45° C.

From 45 Petri dishes (100 mm.), previously prepared, containing about 25 milliliters of medium 1, 15 are inoculated with 1½–2 milliliters of the above agar spore suspension diluted to 1,000, 15 with the 10,000 dilution and the remaining 15 with the 100,000 dilution, in a sterile incubation box having a 60 watt ultraviolet sterilization lamp (Philips or equivalent) near the top and 40 to 65 centimeters from the bottom.

The unique mutagenic treatments are the heat in the 0.5 percent spore suspension and the U.V. light effect during dilution and pouring out same on the plates (which is made at the usual rate without exposing the plates or spores to the U.V. rays for too long).

The plates are then incubated at 27°–28° C., preferably in a cardboard box so as to avoid light.

The screening for mutants is made at the 6th, 9th and 12th day of incubation for colonies of dark brownish pigmentation and strong fluorescence halo under Wood light, etc. The colonies are marked with glass writing pencil under the plate and incubated for 3 to 4 weeks more until the spores are ripe and well developed.

The marked colonies are cut out under sterile conditions and U.V. light, placed in a sterile test tube, containing three to four small glass balls and 3 milliliters of water, and then strongly shaken for 20 minutes.

Test tubes containing media 1 and 2 (six of each) are then inoculated with the so-obtained spores suspension and the remaining amount is used for qualitative and quantitative evaluation of oxytetracycline production. The selected mutants kept on agar slants are submitted subsequently to further mutations by repeating the above mutation technique until substantial oxytetracycline is produced by one of the mutants.

II. Evaluation of oxytetracycline production:

One inoculates simultaneously, with 2 to 3 drops of the above spore suspension of each mutation type, two 200 milliliter Erlenmeyer flasks, containing 30 milliliters of the following medium:

Medium No. 3

| | |
|---|---|
| Corn steep liquor | 10 grams |
| $CaCO_3$ | 1 gram |
| $(NH_4)_2HPO_4$ | 2 grams |
| Dextrose | 10 grams |
| $MgSO_4$ | 0.25 gram |
| Tap water | 1,000 milliliters |

One adjusts the pH to 6.6 and sterilizes for 30 minutes at 120° C. (final pH 6.4 to 6.3).

The inoculated flasks are shaken for 24 hours at 27° to 28° C. (in a rotatory or reciprocating shaker).

Afterwards, 1 milliliter of each flask is transferred to a 200 milliliter Erlenmeyer flask, containing 30 milliliters of the following medium:

Medium No. 4

| | |
|---|---|
| Corn steep liquor (50%) | 30 grams |
| $CaCO_3$ | 9.5 grams |
| $(NH_4)_2SO_4$ | 2.6 grams |
| Dextrose | 12.5 grams |
| Tap water | 1,000 milliliters |

The pH is adjusted to 6.2 and sterilization effected for 30 minutes at 120° C.

Incubation is then carried out for 24 hours at 27°–28° C. in a shaker.

After 24 hours of incubation, 1 milliliter of each flask is transferred to 300 milliliters Erlenmeyer flasks, containing 40 milliliters of the following medium:

Medium No. 5

| | |
|---|---|
| Corn steep liquor (50%) | 25 grams |
| Corn starch (semihydrolyzed, viscous) | 55 grams |
| $CaCO_3$ | 8 grams |
| $(NH_4)_2SO_4$ | 5.7 grams |
| $NH_4Cl$ | 2 grams |
| $ZnSO_4$ | 0.05 gram |
| $CoCl_2 \cdot 6H_2O$ | 0.002 gram |
| $MnSO_4 \cdot 4H_2O$ | 0.05 gram |
| $FeSO_4$ | 0.01 gram |
| Tap water | 1 liter |

To each flask, containing 40 milliliters of this medium, is then added 1 milliliter of a mixture (prepared under heating) of 14 parts by weight of lard and 2 parts by weight of peanut oil and sterilized for 30 minutes at 120° C. The flasks are then shaken for a week at 28° C.

The fermented broths are acidified with dilute hydrochloric acid to pH 1.5 and shaken in a reciprocating filter for 30 minutes. After filtration, the filtrates are paper chromatographed in conventional manner, using oxytetracycline·HCl as standard. The oxytetracycline-producing strains are submitted once again to the same mutation and selection process as described above, and the others discarded.

During this second treatment, there are selected 30 to 40 colonies which are evaluated after shake flask fermentation by a standard oxytetracycline assays method and the highest oxytetracycline yielding strains used for industrial production. A representative mutant obtained by this method is the aforesaid *S. alboflavus* mutant M–108–OX (ATCC 15388–NCIB 9453).

In case the yields do not attain values over 6 grams, a third repetition of the process on the selected mutants is performed. By such repeated selections, mutants producing 10 grams/liter of oxytetracycline can be obtained.

For further description of methods for the qualitative and quantitative determination of oxytetracycline in the fermented flasks, see Novelli et al., 1960, "Sulla determiniazione quantitativa dei prodotti tetraciclinici mediante cromatografia radiale." Farmaco (Pavia), Ed. Prat. 15: 483–492.; for chromatography using oxytetracycline·HCl as standard and for quantitative determination use spectrophotometric determination as described in U.S.P. XV.

EXAMPLE 2

(Examples 2 to 5 inclusive exemplify fermentation by mutants obtained as precedingly described.)

All media in this and the following examples are prepared with tap water.

One liter of the sterilized medium having the compositions:

| | |
|---|---|
| Corn steep liquor | 10 grams |
| Sugar | 10 grams |
| CaCO₃ | 1 gram |
| (NH₄)₂HPO₄ | 2 grams |
| KH₂PO₄ | 2 grams |
| MgSO₄·7H₂O | 0.25 gram |
| Water | 1,000 milliliters | is inoculated with 1 ml. (milliliter) of a spore suspension of *Streptomyces alboflavus* mutant M-108-OX and incubated at 25° C. in a rotatory shaker of 36 hours. Afterwards, a pilot fermenter containing a sterilized medium of the composition:

| | |
|---|---|
| Tap water | 120 liters |
| Starch | 6 kilograms |
| Corn steep liquor (50%) | 2.7 kilograms |
| CaCO₃ | 0.72 kilogram |
| (NH₄)₂SO₄ | 0.8 kilogram |
| NH₄Cl | 0.2 kilogram |
| CoCl₂ | 0.180 gram |
| CuSO₄·5H₂O | 0.6 gram |
| ZnSO₄·7H₂O | 6 grams |
| FeSO₄ | 0.180 gram |
| Sunflower oil | 0.2 kilogram | is inoculated with the above mentioned 36 hours preculture.

Submerged fermentation is then performed at 26° C. under stirring and sterile aeration.

The pH of the medium and the quantity of oxytetracycline formed are determined at several intervals, giving the following values:

| Period of fermentation hours | pH | Amount of oxytetracycline mcg./ml.* |
|---|---|---|
| 0 | 7.2 | — |
| 36 | 6.2 | 180 |
| 46 | 5.9 | 1200 |
| 62 | 5.7 | 2100 |
| 85 | 5.3 | 3400 |
| 110 | 5.6 | 4900 |
| 135 | 6.3 | 6000 |
| 150 | 6.35 | 6600 |

*micrograms per milliliter

Fermentation is stopped after 150 hours, showing a final concentration of oxytetracycline of 6.6 grams per liter.

EXAMPLE 3

The procedure according to example 2 is repeated, but N,N'-dibenzylethylenediamine diacetate is added to the medium in several fractions: 8.4 grams before inoculation, 8.4 grams after 50 hours of fermentation and 8.4 grams after 120 hours. The amount of oxytetracycline obtained after 140 hours is 8.1 grams/liter of broth.

EXAMPLE 4

The fermented broth, obtained in example 2, is acidified with sulfuric acid (25 percent) until pH 1.5, filtered, and the mycelium washed with water. The combined filtrates have a volume of 240 liters. 2 grams/liter of ethylenediaminetetraacetate sodium (sequestering agent) are then added. The pH is adjusted to 6 with aqueous ammonia (12 percent), 150 grams of N,N'-dibenzylethylenediamine diacetate added and the pH raised to 9.5 with aqueous ammonia (12 percent). After stirring for 3 hours, the formed precipitate is filtered and washed until the pH of the washing waters reaches pH 7. The precipitate is dried at 50° C. under vacuum. The dry precipitate obtained is ground and then suspended in twice its weight of methanol. After stirring for 30 minutes, it is acidified with gaseous hydrochloric acid to pH 2 and then with hydrochloric acid (36 percent), the pH lowered to 1.5 and the whole stirred. The mass is filtered, washed with methanol and dried under reduced pressure for 6 hours. Yield in hydrochloride of oxytetracycline: 81 percent.

EXAMPLE 5

The product obtained in example 4 is suspended in the equal weight of methanol and its pH is adjusted to 7.8 with a mixture of 1:1 methanol and triethylamine. The solution thus obtained is filtered. Then the pH is adjusted to 5 and water added in the proportion of five times the volume of the solution. The oxytetracycline base crystallizes. After filtering it off, it is dried under reduced pressure and the base obtained in a yield of 92 percent.

What is claimed is:

1. A fermentative process for the production of oxytetracycline which comprises fermenting a nutrient broth under aerobic conditions at a temperature between 22° and 30° C. by *Streptomyces alboflavus* (ATCC 15388), and recovering accumulated oxytetracycline from the fermented broth.

2. A process according to claim 1, wherein the fermentation is submerged and the nutrient medium contains assimilable carbon and nitrogen sources and mineral salts.

3. A process according to claim 1, wherein the fermented broth is acidified to a pH of 1 to 2 with an acid, the resultant medium is filtered, the pH of the filtrate is increased with aqueous ammonium to pH 5 to 6, N',N'-dibenzylethylenediamine diacetate is added to a total concentration of from about one-tenth up to about one-fifth by weight of the oxytetracycline in the medium, the pH of the medium is adjusted to 8.5 to 9 with aqueous ammonium, and the oxytetracycline is recovered in the form of N,N'-dibenzylethylenediamine complex.

4. A process according to claim 3, wherein the nutrient medium contains calcium ions and the oxytetracycline is recovered in the form of N,N'-dibenzylethylenediamine-calcium complex.

5. A process according to claim 1, wherein N,N'-dibenzylethylenediamine diacetate is added portionwise to the nutrient broth during the fermentation, the amount added being from about 100 to about 3,000 milligrams/liter of medium.

* * * * *